United States Patent [19]
Havinis et al.

[11] Patent Number: 6,104,931
[45] Date of Patent: Aug. 15, 2000

[54] SYSTEM AND METHOD FOR DEFINING LOCATION SERVICES

[75] Inventors: Theodore Havinis, Plano; Stephen Hayes, Carrollton; Maya Roel-Ng, Plano, all of Tex.

[73] Assignee: Ericsson Inc., Research Triangle Park, N.C.

[21] Appl. No.: 09/062,839

[22] Filed: Apr. 20, 1998

[51] Int. Cl.⁷ .................................................. H04Q 7/20
[52] U.S. Cl. ........................... 455/456; 455/433; 455/457
[58] Field of Search .................... 455/456, 414, 455/445, 428, 524, 432, 433, 435, 458

[56] References Cited

U.S. PATENT DOCUMENTS

| | | | |
|---|---|---|---|
| 5,315,636 | 5/1994 | Patel | 379/58 |
| 5,327,144 | 7/1994 | Stilp | 455/456 |
| 5,329,578 | 7/1994 | Brennan et al. | 379/67 |
| 5,504,804 | 4/1996 | Widmark et al. | 379/63 |
| 5,758,281 | 5/1998 | Emery et al. | 455/428 |
| 5,839,072 | 11/1998 | Chien | 455/445 |
| 5,909,471 | 6/1999 | Yun | 375/343 |
| 5,920,820 | 6/1999 | Quresshi et al. | 455/461 |

FOREIGN PATENT DOCUMENTS

| | | |
|---|---|---|
| 2 317 305 | 3/1998 | United Kingdom . |
| WO 97/24010 | 7/1997 | WIPO . |
| WO 98/00988 | 1/1998 | WIPO . |
| WO 98/52379 | 11/1998 | WIPO . |

*Primary Examiner*—Edward F. Urban
*Assistant Examiner*—Marceau Milord
*Attorney, Agent, or Firm*—Jenkens & Gilchrist, P.C.

[57] ABSTRACT

A telecommunications system and method is disclosed for defining location services in a simplified manner based upon whether the positioning request is an interactive request or a batch mode request. In order to initiate a positioning request, a Location Application (LA) must first register with at least one Mobile Location Center (MLC), define the service parameters specific for that LA and receive a Location Application Identifier Number (LAIN). Thereafter, the LA can send either an interactive or batch mode positioning request along with the LAIN. An interactive positioning request is a request to position a specific subscriber or group of subscribers immediately, while a batch mode positioning request is a request to position a subscriber or group of subscribers when a particular event defined by the LA occurs. Advantageously, the definition of location services is decoupled from issues, such as the point of origin of the request, the identity of the subscriber to be positioned and authorization options.

12 Claims, 5 Drawing Sheets

SYSTEM AND METHOD FOR DEFINING LOCATION SERVICES

BACKGROUND OF THE PRESENT INVENTION

Field of the Invention

The present invention relates generally to telecommunications systems and methods for determining the location of a mobile terminal within a cellular network, and specifically to defining a generic format for requesting location services, which can be tailored for each individual location application such that a positioning request can be sent by any location application within any cellular network.

BACKGROUND AND OBJECTS OF THE PRESENT INVENTION

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 18 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

The VLR 16 is a database containing information about all of the MS's 20 currently located within the MSC/VLR area 12. If an MS 20 roams into a new MSC/VLR area 12, the VLR 16 connected to that MSC 14 requests data about that MS 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Determining the geographical position of a MS 20 within a cellular network 10 has recently become important for a wide range of applications. For example, positioning services may be used by transport and taxi companies to determine the location of their vehicles. In addition, for emergency calls, e.g., 911 calls, the exact location of the mobile terminal 20 may be extremely important to the outcome of the emergency situation. Furthermore, positioning services can be used to determine the location of a stolen car, for the detection of home zone calls, which are charged at a lower rate, for the detection of hot spots for micro cells, or for the subscriber to determine, for example, the nearest gas station, restaurant, or hospital, e.g., Where am I service.

As can be seen in FIG. 2 of the drawings, upon a network positioning request, the Base Station System (BSS) (220 and 240) serving the MS 200 to be positioned generates positioning data, which is delivered to the MSC 260. This positioning data is then forwarded to a Mobile Location Center (MLC) 270 for calculation of the geographical location of the MS 200. The location of the MS 200 can then be sent to a Location Application (LA) 280 that requested the positioning. Alternatively, the requesting LA 280 could be located within the MS 200 itself, within the MSC/VLR 260 or could be an external node, such as an Intelligent Network (IN) node.

In order to accurately determine the location of the MS 200, positioning data from three or more separate BTS's (210, 220, and 230) is required. This positioning data for GSM systems can include, for example, a Timing Advance (TA) value, which corresponds to the amount of time in advance that the MS 200 must send a message in order for the BTS 220 to receive it in the time slot allocated to that MS 200. When a message is sent from the MS 200 to the BTS 220, there is a propagation delay, which depends upon the distance between the MS 200 and the BTS 220. TA values are expressed in bit periods, and can range from 0 to 63, with each bit period corresponding to approximately 550 meters between the MS 200 and the BTS 220.

Once a TA value is determined for one BTS 220, the distance between the MS 200 and that particular BTS 220 is known, but the actual location is not. If, for example, the TA value equals one, the MS 200 could be anywhere along a radius of 550 meters. Two TA values from two BTSs, for example, BTSs 210 and 220, provide two possible points that the MS 200 could be located (where the two radiuses intersect). However, with three TA values from three BTSs, e.g., BTSs 210, 220, and 230, the location of the MS 200 can be determined with a certain degree of accuracy. Using a triangulation algorithm, with knowledge of the three TA values and site location data associated with each BTS (210, 220, and 230), the position of the MS 200 can be determined (with certain accuracy) by the MLC 270.

It should be understood, however, that any estimate of time, distance, or angle for any cellular system 205 can be used, instead of the TA value discussed herein. For example, the MS 200 can have a Global Positioning System (GPS) receiver built into it, which is used to determine the location of the MS 200. In addition, the MS 200 can collect positioning data based on the Observed Time Difference (OTD) between the time a BTS 220 sends out a signal and the time the MS 200 receives the signal. This time difference information can be sent to the MLC 270 for calculation of the location of the MS 200. Alternatively, the MS 200, with knowledge of the location of the BTS 220, can determine its location.

As the market demands higher accuracy, it is becoming necessary for the network 205 to have knowledge of all relevant input factors. Such input factors include the requested quality of service, time of day of request, the requesting LA, subscription status of the subscriber, as well as positioning method capabilities of the serving network 205 and of the subscriber terminal 200. Recent attempts to define location services have focused upon the point of origin of the positioning request, e.g., an external LA 280, a network-based LA 280 or a LA 280 residing within the MS 200, the identity of the subscriber to be positioned, and issues regarding privacy and authorization of the LA 280 to perform the positioning. However, by defining location services in this manner, all possible or potential parameters, e.g., authorization codes, positioning method, emergency override on privacy, and group identification, need to be defined and the format established prior to implementing the location service. In addition, existing definitions require built-in dependencies between location services and the point of origin of the positioning request, the identity of the subscriber to be positioned, and authorization and privacy options. Thus, network operators cannot tailor location services for specific LA's 280 without introducing new authorization procedures for all LA's 280.

It is, therefore, an object of the present invention to define a generic format for positioning requests sent by Location Applications such that the location services can be utilized by any positioning system within any wireless network.

It is a further object of the present invention to allow network operators to define location services based upon the service parameters required by each individual Location Application.

SUMMARY OF THE INVENTION

The present invention is directed to telecommunications systems and methods for defining location services in a simplified manner based upon whether the positioning request is an interactive request or a batch mode request. In order to initiate a positioning request, the requesting Location Application (LA) must first register with at least one Gateway Mobile Location Center (GMLC), define the service parameters specific for that LA and receive a Location Application Identifier Number (LAIN). Thereafter, the LA can send either an interactive or batch mode positioning request, depending upon the service parameters established by that LA. An interactive positioning request is a request to position a specific subscriber or group of subscribers immediately, while a batch mode positioning request is a request to position a subscriber or group of subscribers when a particular event defined by the requesting application occurs. Advantageously, by defining location services in the aforementioned manner, the definition of location services becomes decoupled from issues, such as the point of origin of the request, the identity of the subscriber to be positioned and authorization and privacy options.

BRIEF DESCRIPTION OF THE DRAWINGS

The disclosed inventions will be described with reference to the accompanying drawings, which show sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
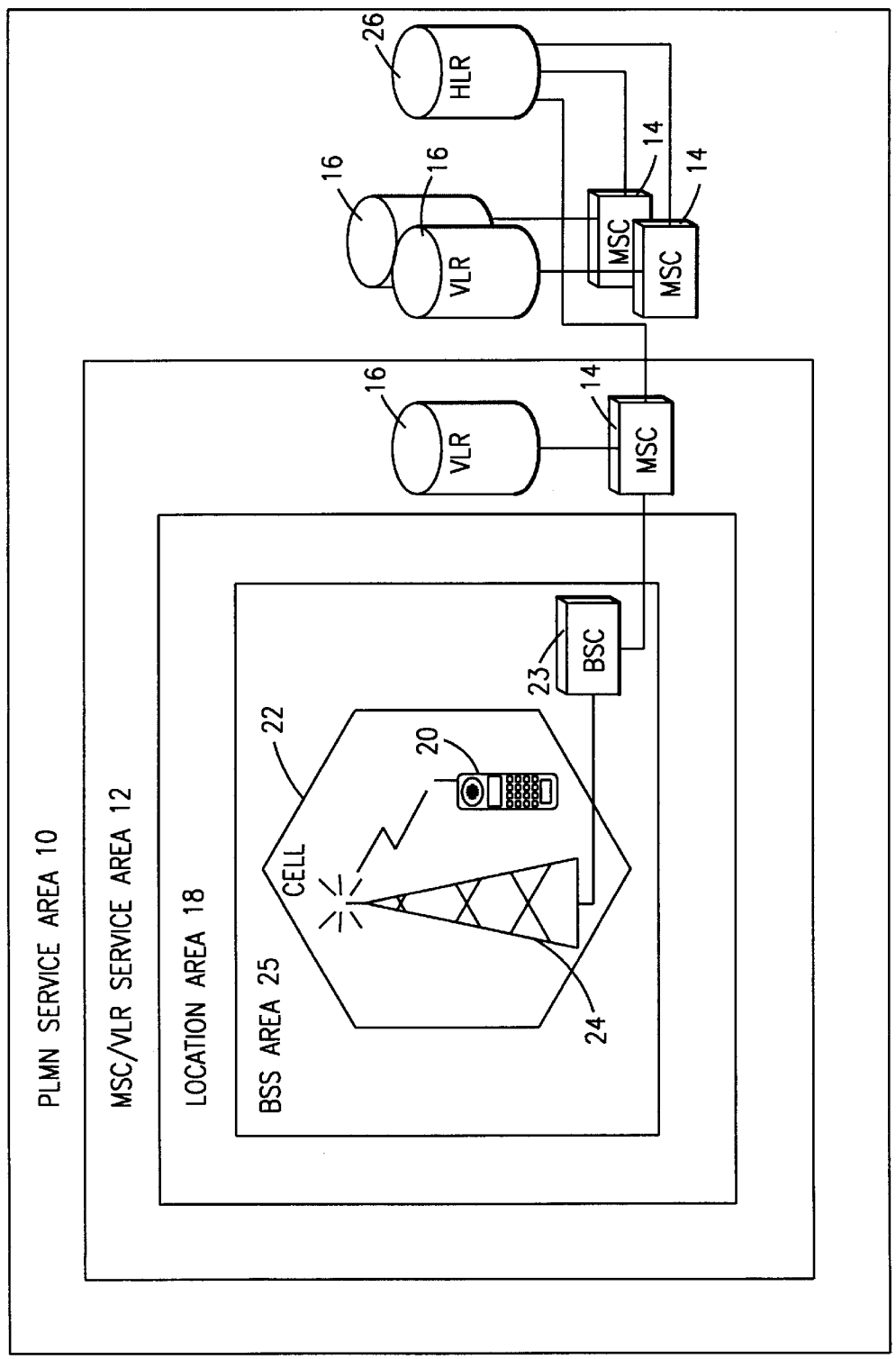
FIG. 1 is a block diagram of a conventional terrestrially-based wireless telecommunications system.
Figure 2:
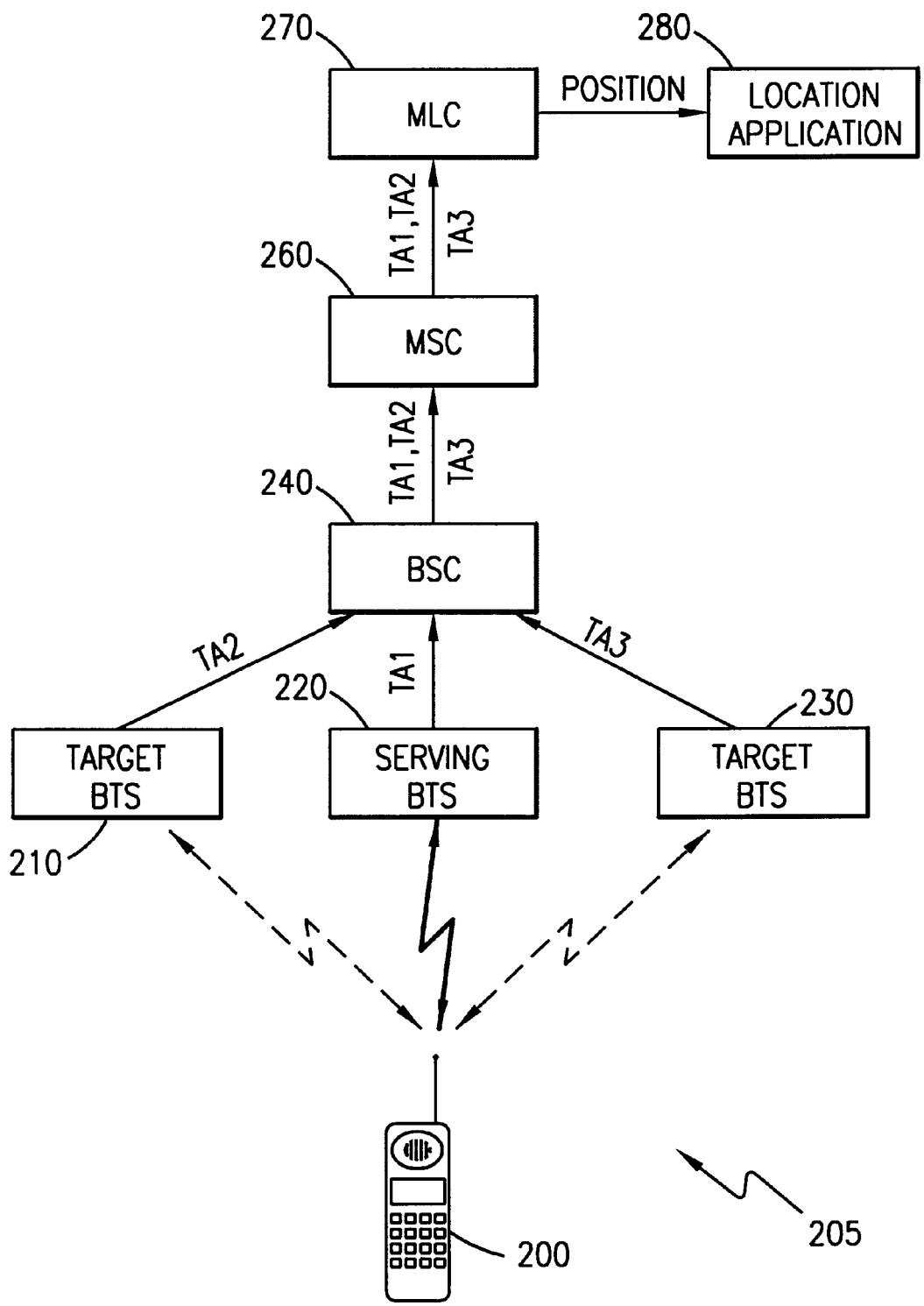
FIG. 2 illustrates a sample positioning handover in which positioning data is acquired by a target base transceiver station and transmitted to a serving base station controller.
Figure 3:
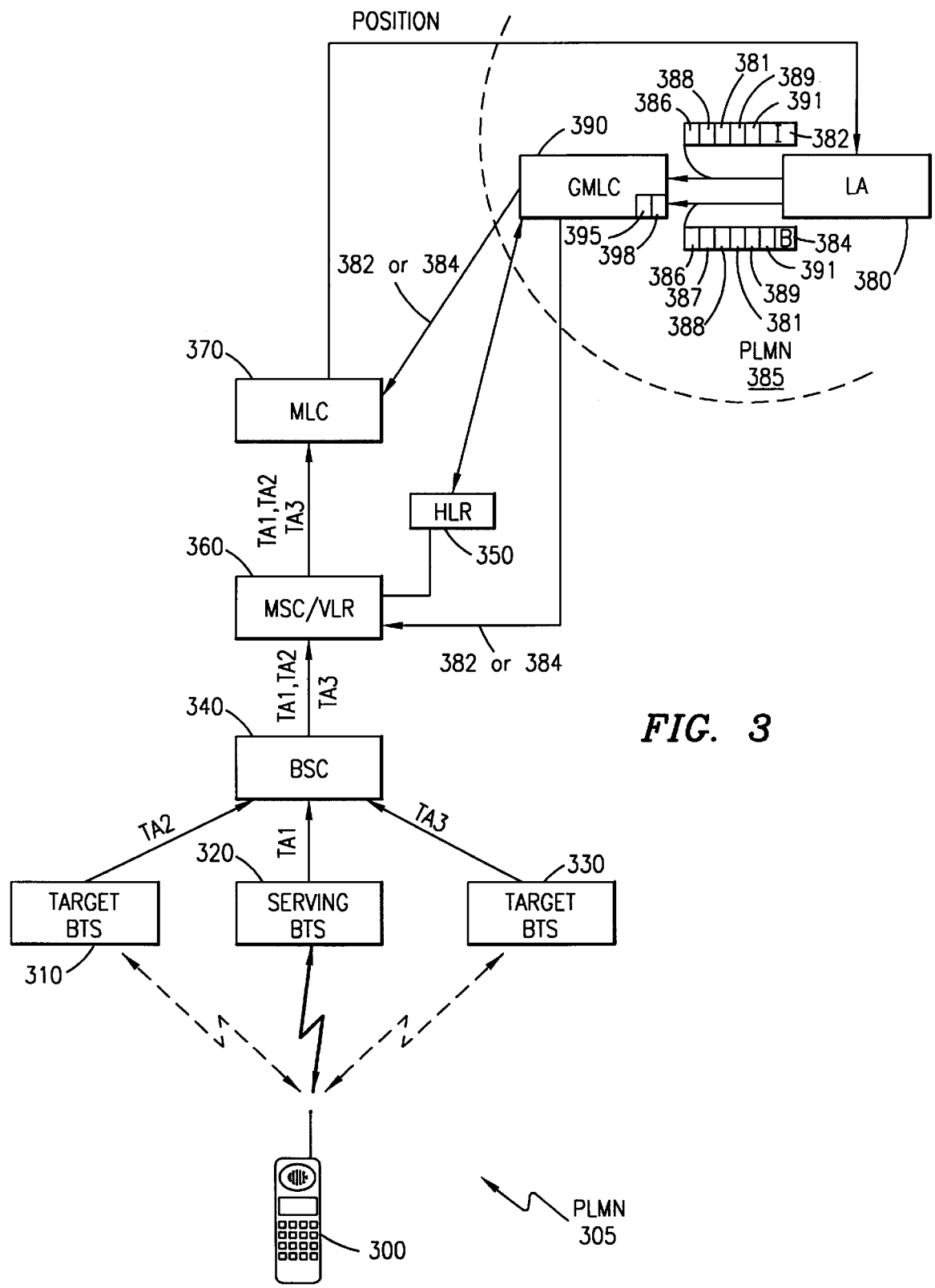
FIG. 3 illustrates positioning of at least one mobile terminal by a Location Application (LA), which has defined its location services in accordance with preferred embodiments of the present invention.
Figure 4:
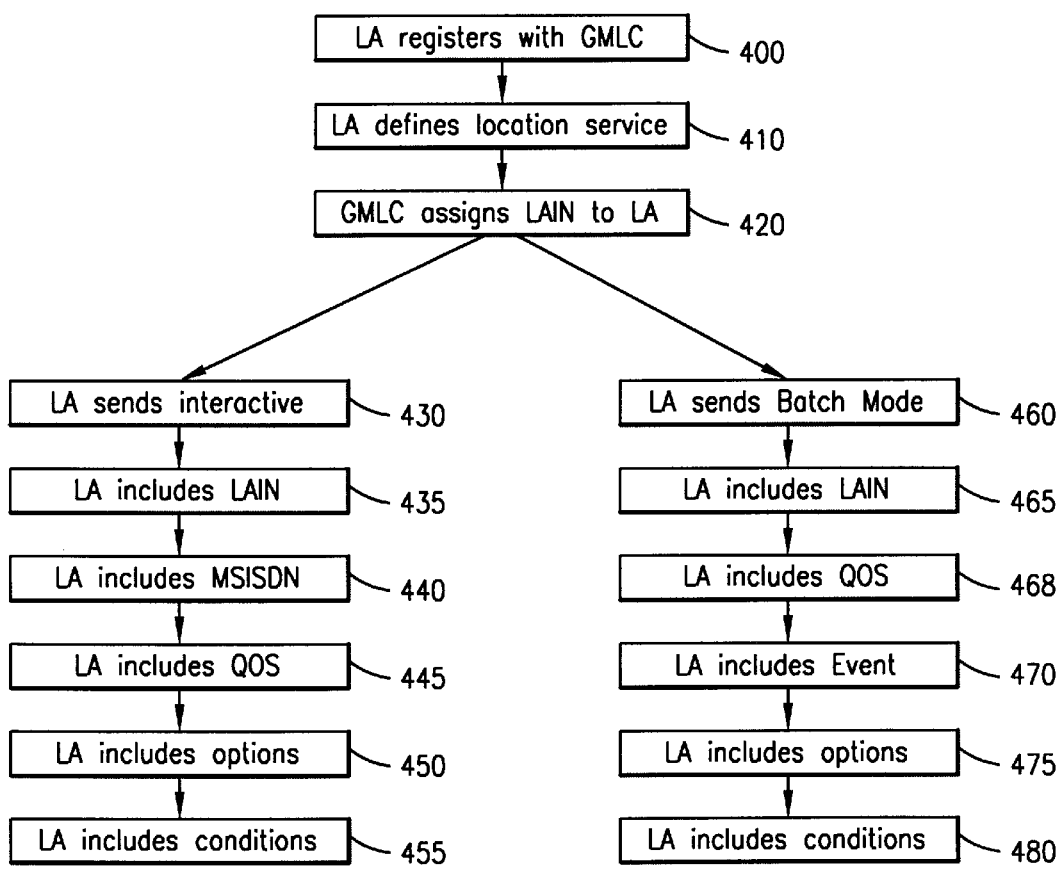
FIG. 4 demonstrates steps in a sample defining of location services and sending of a positioning request by a requesting LA in accordance with preferred embodiments of the present invention.

With reference now to FIG. 3 of the drawings, which will be described in connection with FIG. 4 of the drawings, prior to sending a positioning request (step 430 or 460), a requesting Location Application (LA) 380 must first register with a Gateway Mobile Location Center (GMLC) 390 (step 400) and define within, for example, a database 398 within the GMLC 390 its location services profile, e.g., all of the relevant service parameters specific to that LA 380 (step 410). For example, the LA 380 can define whether the LA 380 has the authority to initiate an interactive positioning request 382, a batch mode positioning request 384 or both. In addition, the LA 380 can define whether the LA 380 has the authority to override privacy settings of all subscribers, as in the case of an emergency center, or particular subscribers, as in the case of a law enforcement agency. Furthermore, the LA 380 can define whether the LA 380 is associated with a group of subscribers, e.g., a fleet management company, and the particular Mobile Station International Subscriber Directory Number's (MSISDN's) associated with that group. The MSISDN is the digit string associated with a particular Mobile Station (MS) 300.

Once the LA 380 has defined the service parameters 398 specific to that LA 380 (step 410), the GMLC 390 assigns a Location Application Identifier Number (LAIN) 386 (step 420), which identifies the particular LA 380 and the associated service parameters 398. Thereafter, the requesting LA 380 can send its LAIN 386 in either an interactive positioning request 382 (step 430) or a batch mode positioning request 384 (step 460) for a particular MS 300 or a group of MS's 300 to the GMLC 390, which is the GMLC 390 for the Public Land Mobile Network (PLMN) 385 that the LA 380 is in. An interactive positioning request 382 is performed immediately upon verification of authorization, using the service parameters 398 defined by the LA 380, while a batch mode positioning request 384 is performed only upon the occurrence of an event defined by the LA 380 when the batch mode positioning request 384 is sent.

If the positioning request is an interactive positioning request 382 (step 430), the LA 380 must include the LAIN 386 (step 435) and the MSISDN(s) 388 (step 440) for the MS(s) 300 to be positioned and quality of service information 381 (step 445). If, the LA 380 is a group-related application, a group ID associated with the MSISDN's to be positioned can be sent with the positioning request. The GMLC 390 can then cross-reference the group ID with the LAIN 386 and verify that the specified MSISDNs 388 associated with the MSs 300 to be positioned belong to the specified group ID to ensure that the LA 380 has the authority to position those MS's 300.

In addition, the LA 380 can also include a number of optional service parameters 389 (step 450) along with the interactive positioning request 382, together with the mandatory LAIN 386, MSISDN(s) 388 associated with the MS(s) 300 to be positioned and quality of service information 381. For example, if the LA 380 is a group-related application, a requesting identifier number may also need to be included to identify the particular person who is requesting the positioning of the MS's 300 within the group. As an example, if the LA 380 is a fleet management system, where numerous employees have access to the system that initiates the positioning requests, certain employees may not have access to the system, or may only have limited access to the system, e.g., only certain MS's 300 within the group can be positioned by that employee. Thus, when the fleet management company defines its service parameters 398 (step 410), it can require the inclusion of a requesting identifier number in the interactive positioning request 382 in order to prevent unauthorized positioning of the MS's 300 within the fleet management system group.

Another optional service parameter 389, which can be included along with the interactive positioning request 382, is a called-party number, which can be used by the GMLC 390 to verify whether or not the particular MS 300 to be positioned currently has a connection with that called-party number. For example, if the LA 380 is a taxi dispatch service, and a subscriber has called that taxi service requesting a taxi, but is unsure of his or her current location, the taxi dispatch service can initiate a positioning request for the MS 300 associated with that subscriber in order to send a taxi to that subscriber's location. If the taxi dispatch service defined its location services profile 398 (step 410) such that the positioning of a MS 300 can only be performed if that MS 300 has a call connection to the number associated with the taxi service, the taxi dispatch service can include the called-party number, which is the digit string associated with the taxi dispatch service, in the interactive positioning request 382. In addition, the taxi dispatch service can also include a calling-party number, which is the MSISDN associated with the MS 300 of the subscriber requesting the taxi. Therefore, by using the called-party number and calling-party number, the GMLC 390 can determine whether the MS 300 to be positioned has a call connection to the taxi company, and thus, whether the LA 380 has the authority to position that MS 300.

In some situations, the MS 300 may have a call connection to a third party, e.g., a service which provides transportation to subscribers who have been drinking, which is relaying the request for taxi service to the taxi dispatch service. In that case, a redirected number can also be included along with the called-party number and calling-party number in the interactive positioning request 382.

Finally, the LA 380 can include optional conditions 391 (step 455) in the interactive positioning request 382. For example, the LA 380 can specify that the positioning should only be performed if the MS 300 is within a certain geographical area, e.g., a cell, location area, local access transport area, Mobile Switching Center area, state, or country. In addition, the LA 380 can specify that the positioning should only be performed if the MS 300 is in a particular state, e.g., connected to a particular number, as described in the taxi example hereinbefore. It should be understood that many other types of conditions 391 and/or optional service parameters 389 can be included in the interactive positioning request 382, depending upon the needs of the particular LA 380.

If the positioning request is a batch mode positioning request 384 (step 460), the LA 380 must include its LAIN 386 (step 465), the quality of service information 381 (step 468) and a particular event 387 (step 470) which must occur for positioning to be performed. The MSISDN(s) 388 associated with the MS(s) to be positioned are also typically required to be included in the batch mode positioning request 384. However, if the LA 380 is an emergency center, the emergency center can define the event 387 as position any MS 300 that dials "911", regardless of the MSISDN 388 or whether the particular MS 300 has an MSISDN 388 (in the case where service for the MS 300 has not yet been activated). In that case, when an MS 300 dials "911", a Mobile Switching Center/Visitor Location Register (MSC/VLR) 360 serving the area 305 that the MS 300 is in triggers the positioning request in a serving Mobile Location Center (MLC) 370, and positioning of the MS 300 is performed. Thus, the emergency call can be routed to the appropriate Public Safety Answering Point (PSAP) (not shown) and emergency services can be dispatched to the current location of the MS 300.

The event 387 which triggers positioning of the MS 300 can range from a call originated by the MS 300 to a location update performed by the MS 300. For example, if the MS 300 has a location-based charging service plan, every time the MS 300 places a call, positioning of the MS 300 is performed to determine the amount to charge the subscriber for the call. In this case, the LA 380 would send a batch mode positioning request 384 for the MSISDN 388 associated with the MS 300 to be positioned and an indication (event 387) that positioning is to be performed only when the MS 300 originates a call. In an alternative embodiment, the LA 380 can specify (define the event 387) that positioning of the MS 300 is only performed when a mobile terminating call occurs, e.g., the MS 300 receives a call.

In addition, the triggering event 387 can be a Short Message Service (SMS) message sent from or to the MS 300. Alternatively, the event 387 could be an Unstructured Supplementary Service Data (USSD) message, a Call Independent Supplementary Service (CISS) message or a Location Update message. Furthermore, as discussed hereinbefore, an emergency center can send a positioning request without an indication of the MSISDN 388 to the GMLC 390 and request (include an event 387) positioning to be performed only when the MSC/VLR 360 receives a "911" call.

It should, therefore, be understood that any triggering event 387 can be defined by the LA 380, and only upon the occurrence of the event 387, is the MS 300 positioned. Alternatively, the LA 380 can define a series of events 387 to occur before positioning is performed. For example, the LA 380 can define the events 387 such that upon the occurrence of a specified event 387, the LA 380 is notified of the occurrence, and the LA must then send a message, such as "proceed with the positioning," for positioning to occur. If, for example, the first event 387 is the performance of a location update (either periodic or when the MS 300 actually enters into a new location area), the GMLC 390 can notify the LA 380 that a location update has occurred. Thereafter, if the LA 380 desires positioning to be performed, the LA 380 can send a message, such as "proceed with the positioning," to the GMLC 390, which is the second event 387 defined by the LA 380 for positioning to occur.

Optional service parameters 389 can also be included (step 475) in the batch mode positioning request 384, such as the requesting identifier number, as described hereinabove. In addition, conditions 391 can be included, such as the location of the MS 300 or the state of the MS 300, e.g., call connected.

Figure 5:
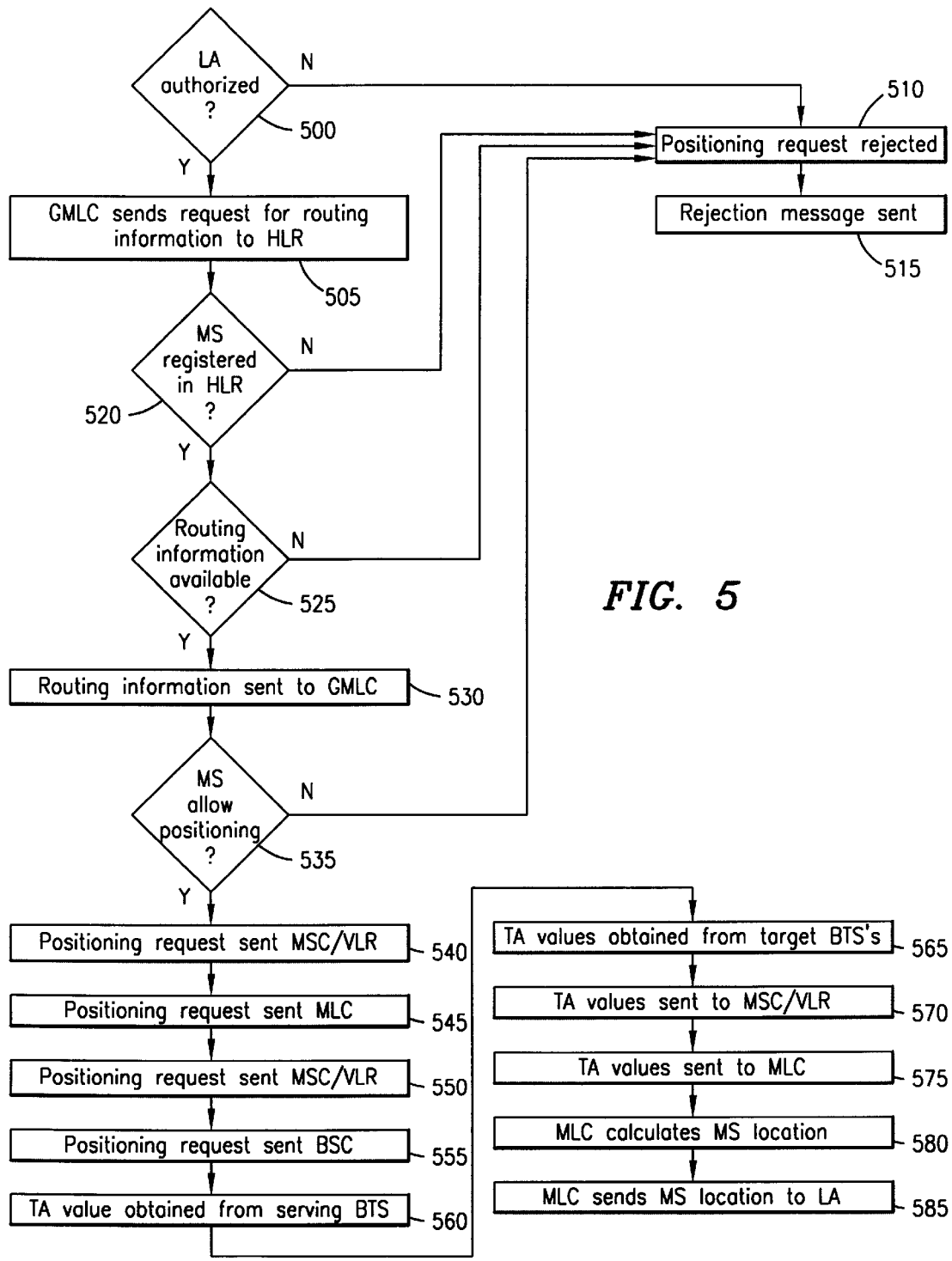
FIG. 5 demonstrates steps in a sample positioning of a specific mobile terminal by a LA, which has defined its location services in accordance with preferred embodiments of the present invention.

With reference now to FIG. 5 of the drawings, once the GMLC 390 determines that the LA 380 is authorized to request positioning of the MS 300 (step 500), the GMLC 390 can then send a request for routing information (step 505), e.g., the address of the Mobile Switching Center/Visitor Location Register (MSC/VLR) 360 serving the PLMN 305 that the MS 300 is currently located in and positioning subscription information for the MS 300, to the MS's 300 Home Location Register (HLR) 350, using the MS's 300 directory number as a global title. The signaling network, e.g., the Signaling System #7 (SS7) network (not shown), can perform a global title translation on the MSISDN 388 and route the request to the appropriate HLR 350 for the MS 300. It should be noted that if, however, the LA 380 is not authorized to request positioning of the MS 300 (step 500), the positioning request 382 or 384 is rejected by the GMLC 390 (step 510) and a rejection message is sent to the LA 380 (step 515).

The HLR 350 then checks its records to confirm that the MS 300 is registered in the HLR 350 (step 520), and that routing information for that MS 300 is available (step 525). If the MS 300 is not registered in the HLR 350 (step 520) or the routing information is not available (step 525), the routing information request is rejected by the HLR 350 (step 510) and the GMLC 390 sends a rejection message to the LA 380 (step 515). However, if the MS 300 is registered in the HLR 350 (step 520) and routing information is available (step 525), the routing information, e.g., the serving MSC/VLR 360 address, together with the positioning subscription information, is sent to the GMLC 390 (step 530).

The GMLC 390 then verifies that the MS 300 to be positioned by the LA 380 allows positioning to be performed, by checking the positioning subscription information, e.g., privacy indication, sent by the HLR 350 (step 535). Alternatively, the serving MSC/VLR 360 or serving MLC 370 can check the privacy indication of the MS 300. However, if, for example, the LA 380 is an emergency center or a law enforcement agency, the LA 380 can define its location services 398 (step 410) such that the privacy indications established by the subscriber can be overridden to perform positioning. In this case, the GMLC 390 does not check the privacy indications of the MS 300. If the MSC/VLR 360 or MLC 370 normally performs the check, the privacy override indication is passed onto the MSC/VLR 360 or MLC 370 from the GMLC 390 along with the positioning request 382 or 384. It should be noted that other service parameters (either defined 398 originally by the LA 380 or sent 389 and 391 with the positioning request 382 or 384) can also be passed onto additional nodes during the positioning process.

If the MS 300 does not allow positioning (step 535), the positioning request 382 or 384 is rejected (step 510) and a rejection message is sent to the LA 380 (step 515). However, if the MS 300 does allow positioning (step 535), the GMLC 390 can then send the positioning request to the serving MSC/VLR 360 (step 540), using the MSC/VLR 360 address. Thereafter, the serving MSC/VLR 360 will route the positioning request to the MLC 370 serving the PLMN 305 that the MS 300 is located in (step 545). It should be understood that the MLC 370 can be co-located with the serving MSC/VLR 360 or can be a separate node.

Alternatively, after the GMLC 390 confirms that the MS 300 allows positioning to be performed (step 535), the GMLC 390 can derive, from the MSC/VLR 360 address, the address of the MLC 370 in the serving PLMN 305, using, for example, a look-up table (database) 395. Thereafter, the positioning request 382 or 384 can be routed directly to the MLC 370 in the serving PLMN 305 (step 545).

Once the positioning request 382 or 384 is received by the serving MLC 370 (step 545), the MLC 370 sends the positioning request 382 or 384 to the serving MSC/VLR 360 (step 550), which can then forward the positioning request 382 or 384 to a Base Station Controller (BSC) 340 (step 555). If the MS 300 is in idle mode, the serving MSC/VLR 360 must page the MS 300 and setup a call to the MS 300 prior to forwarding the positioning request 382 or 384 to the BSC 340 (step 555). This call does not activate the ringing tone on the MS 300, and therefore, is not noticed by the MS 300.

The originating BSC 340 then determines which Base Transceiver Station (BTS) 320 is currently serving the MS 300, and obtains a Timing Advance (TA) value (TA1), or other positioning data, from this serving BTS 320 (step 560), if possible. Thereafter, TA values are obtained from at least two target BTSs (310 and 330) (step 565) by performing a positioning handover. If the serving BTS 320 does not support positioning, an additional target BTS (not shown) must be selected. It should be noted that other positioning methods can be used instead of obtaining TA values, as discussed herein. In addition, positioning of the MS 300 can be performed using more than three BTSs (310, 320, and 330).

The TA values (TA2 and TA3) measured by the target BTS's (310 and 330) are then transmitted by the serving BSC 340 to the MSC 360, together with the TA value TA1 obtained from the serving BTS 320 (step 570). Finally, the TA values (TA1, TA2 and TA3) are forwarded to the serving MLC 370 from the MSC/VLR 360 (step 575), where the location of the MS 300 is determined using the triangulation algorithm (step 580). The MLC 370 then presents the geographical position of the MS 300 to the requesting LA (node) 380 (step 585).

As will be recognized by those skilled in the art, the innovative concepts described in the present application can be modified and varied over a wide range of applications. Accordingly, the scope of patented subject matter should not be limited to any of the specific exemplary teachings discussed.

For example, it should be noted that the location services can be used by applications located-in or connected-to the subscriber's MS, by network applications or by external applications.

In addition, it should be understood that other positioning methods, instead of the Timing Advance positioning method discussed herein, can be used to determine the location of the mobile terminal. For example, such positioning methods can include: Time of Arrival, Angle of Arrival, Global Positioning System, Observed Time Difference, or Enhanced Observed Time Difference.

Furthermore, it should be understood that the positioning systems and methods disclosed herein can be utilized by any cellular network, including, but not limited to the Global System for Mobile Communications (GSM) network, the Personal Communications Systems (PCS) network, the AMPS network and the D-AMPS network.

What is claimed is:

1. A telecommunications system for defining location services profiles associated with location application nodes that request positioning of mobile terminals within a cellular network, said telecommunications system comprising:

a gateway mobile location center within said cellular network, said gateway mobile location center having a database therein for storing said location services profiles; and a given one of said location application nodes in communication with said gateway mobile location center, said given location application node defining said location services profile associated with said given location application node that is stored within said database, said gateway mobile location center assigning an identifier number to said given location application node, said given location application node sending a positioning request containing said identifier number and requesting positioning of a mobile terminal to said gateway mobile location center, said gateway mobile location center using said identifier number to retrieve said location services profile associated with said given location application node, said gateway mobile location center using said associated location services profile in performing positioning of the mobile terminal.

2. The telecommunications system of claim 1, wherein said positioning request is an interactive positioning request, said interactive positioning request including a Mobile Station International Subscriber Directory Number therein, said Mobile Station International Subscriber Directory Number being associated with the mobile terminal to be positioned.

3. The telecommunications system of claim 1, wherein said positioning request is a batch mode positioning request, said batch mode positioning request having an event associated therewith, said event indicating to said gateway mobile location center when to perform positioning of the mobile terminal.

4. The telecommunications system of claim 1, wherein said positioning request has an optional parameter therein.

5. The telecommunications system of claim 1, wherein said positioning request has a condition parameter therein.

6. The telecommunications system of claim 1, wherein said positioning request has a quality of service parameter therein.

7. A method for defining location services profiles associated with location application nodes that request positioning of mobile terminals within a cellular network, said method comprising the steps of:

registering, by a given one of said location application nodes in communication with a gateway mobile location center, with said gateway mobile location center;

defining, by said given location application node, said location services profile associated with said given location application node, said location services profile being stored in a database within said gateway mobile location center;

assigning, by said gateway mobile location center, an identifier number to said given location application node; and sending, by said given location application node, a positioning request to said gateway mobile location center, said positioning request containing said identifier number and requesting positioning of a mobile terminal, said gateway mobile location center using said identifier number to retrieve said location services profile associated with said given location application node, said gateway mobile location center using said associated location services profile in performing positioning of the mobile terminal.

8. The method of claim 7, wherein said positioning request is an interactive positioning request, said interactive positioning request including a Mobile Station International Subscriber Directory Number therein, and further comprising, after said step of sending said positioning request, the step of:

positioning, by said gateway mobile location center, the mobile terminal associated with said Mobile Station International Subscriber Directory Number.

9. The method of claim 7, wherein said positioning request is a batch mode positioning request, said batch mode positioning request having an event associated therewith, and further comprising, after said step of sending said positioning request, the step of:

positioning, by said gateway mobile location center, the mobile terminal when said event occurs.

10. The method of claim 7, wherein said positioning request has an optional parameter therein.

11. The method of claim 7, wherein said positioning request has a condition parameter therein.

12. The method of claim 7, wherein said positioning request has a quality of service parameter therein.

\* \* \* \* \*